400

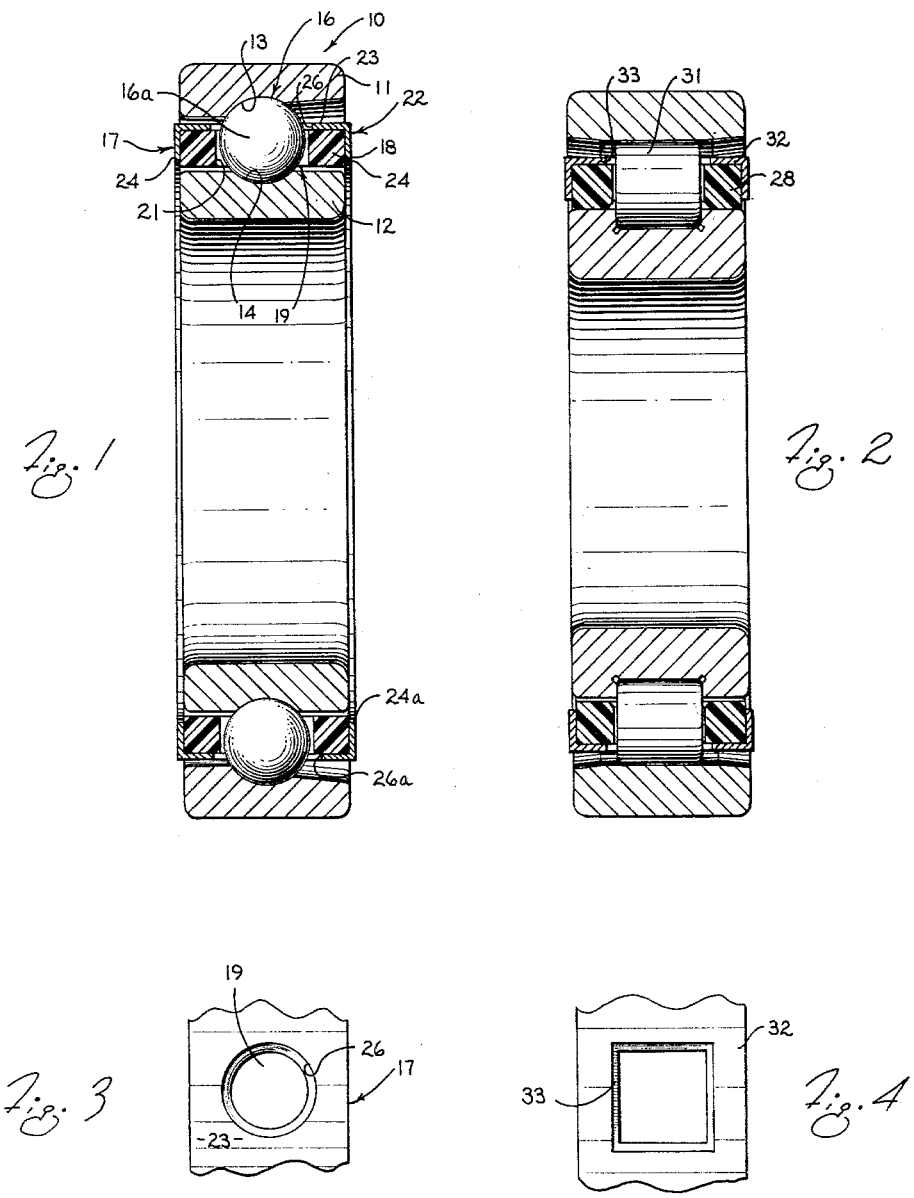

United States Patent Office 3,162,493
Patented Dec. 22, 1964

3,162,493
REINFORCING GRAPHITE AND PLASTIC SEPARATORS BY ELECTROFORMED METALLIC SHELLS
Heinz Hanau, Los Angeles, Calif., assignor to Industrial Tectonics, Inc., Ann Arbor, Mich., a corporation of Michigan
Filed Aug. 31, 1962, Ser. No. 220,693
5 Claims. (Cl. 308—201)

This invention relates to improvements in rolling-element bearing constructions and, more particularly, relates to improved separators or retainers for use in ball and roller-bearing constructions. The bearing construction of the invention is especially useful in situations involving extreme temperatures both high and low and/or high-speed operation. However, it is also useful in situations where these conditions are not encountered.

Separators or retainers, as commonly used in ball and roller bearings, perform an important and often critical role in the bearing performance in that they space the bearing balls or rollers evenly in the races of the inner and outer bearing rings. Separators are presently made of various materials including steel, bronze and various synthetic materials, such as reinforced phenolic resin. While such separators are satisfactory for many applications, there are some applications for which bearings utilizing such separators have not proven satisfactory, particularly in applications where lubrication of the bearing is difficult, as when extreme temperatures and/or high-speed operation are involved, so that the bearing must operate for short periods of time without lubrication or with only scant lubrication or with materials having poor lubricating properties.

There are a number of materials which have at least some self-lubricating properties and which also have low-friction and low-wear characteristics when in contact with rolling elements. Examples of such materials are graphite, nylon, polytetrafluoroethylene and various plastics, such as phenol-formaldehyde, impregnated with a solid lubricant, such as graphite and molybdenum disulphide. In the following description and claims, the term "self-lubricating material" shall means materials of this type.

If a separator could be formed of a self-lubricating material, it would be well suited for use in bearing constructions which are to operate under no lubrication or poor-lubrication conditions for limited time periods because the self-lubricating property of such material would minimize the detrimental effects which otherwise would result from the lack of adequate lubrication. However, self-lubricating materials have low tensile strengths, are brittle, and have relatively poor dimensional stability and these detrimental qualities have in the past prevented the use of separators made of self-lubricating materials for many bearing applications.

Accordingly, the objects of the invention including the following are:

(1) To provide an improved rolling-element bearing construction having an improved separator therein, which separator is comprised of a self-lubricating material.

(2) To provide an improved separator made of a self-lubricating material which has adequate strength and dimensional stability for use within all temperature ranges (cryogenic to high temperature), within very wide ranges of speeds, or under conditions of rapidly changing temperatures and/or speeds, and which can withstand shock and vibration loadings.

(3) To provide an improved separator, as aforesaid, which has low-friction characteristics.

(4) To provide an improved separator, as aforesaid, which has a minimum weight.

(5) To provide an improved separator, as aforesaid, which has improved antigalling characteristics.

(6) To provide an improved separator, as aforesaid, which can survive for at least short periods of time without lubrication or with only scant lubrication.

(7) To provide an improved separator, as aforesaid, which can be manufactured at relatively low cost and which, nevertheless, is suitable for use in high precision bearings.

Other objects and advantages of the invention will become apparent to persons acquainted with devices of this type upon reading the following disclosure and inspecting the accompanying drawings.

In the drawings:

FIGURE 1 is a central sectional view of a ball-bearing construction embodying the invention.

FIGURE 2 is a central sectional view of a roller-bearing construction embodying the invention.

FIGURE 3 is a plan view of a fragment of the separator shown in FIGURE 1.

FIGURE 4 is a plan view of a fragment of the separator shown in FIGURE 2.

Referring to the drawings, FIGURE 1 discloses a ball-bearing construction 10 which is of a conventional type except for the separator thereof, as described in greater detail hereinbelow. While the ball-bearing construction 10 here chosen to illustrate the invention is of the single-row, angular-contact type, the separator construction of the invention is not limited to such a bearing construction and it can be used on radial-type, double row-type, thrust-type and other types of bearing construction wherein the use of a separator may be desired. In various other respects also, such as details of bearing construction, materials referred to and dimensional relationships, the following described bearings are set forth solely for illustating the invention and are not to be taken as limiting.

The ball-bearing construction 10 is comprised of an outer bearing ring 11 and an inner bearing ring 12 which are concentric and radially spaced from each other. The bearing rings 11 and 12 have radially aligned, opposed, raceways 13 and 14. An annular row of bearing balls 16 is disposed between the bearing rings 11 and 12 and said balls are received in the raceways 13 and 14 in conventional fashion.

An annular separator 17 is disposed between the bearing rings 11 and 12 and is maintained in free-floating relationship with respect thereto. The separator 17 is comprised of a main body part 18 which is made of a self-lubricating material, such as nylon. The axial length of the main body part 18 is preferably not greater than, equal to in this embodiment, the axial length of the bearing rings 11 and 12, and the radial thickness thereof is somewhat less than the distance between the opposing surfaces of said bearing rings. The body part 18 has a series of radial openings 19 therethrough, which openings are circumferentially spaced apart equidistantly. A bearing ball 16a is received in each of said openings 19 so that said bearing balls are continuously spaced apart substantially equal circumferential distances. Here the openings 19 are circular in cross section and have a peripheral wall 21 which is straight in a radial direction. The diameters of the openings 19 are identical and are only slightly greater than the diameters of the bearing balls 16 so that free rolling of the balls is permitted but the balls are prevented from any substantial axial or circumferential movement with respect to the separator 17.

The separator 17 includes an electrodeposited metal shell 22 which is tenaciously adhered to the main body part 18. The shrinkage of the metal during the electroforming process insures a strong and intimate bond between the shell 22 and said body part. The shell 22 has an axially extending rim portion 23 and a pair of radially extending end portions 24. The rim portion 23 extends around the periphery of the body part 18 and has a series of openings 26 therethrough, said openings being radially aligned with and being of slightly larger diameter than the openings 19 in the main body part 18 so that the edge 26a of said openings 26 is spaced slightly from the edge of the opening 19. The peripheral wall 21 of the opening 19 is uncoated so that the bearing balls can contact only the body part 18. A ball 16a extends through each of the openings 26 but said ball cannot contact the edge 26a of said opening 26 because said edge is offset from the center of the ball and from the edge of opening 19. Thus, scoring or galling of the parts by contact of the balls with the metal shell 22 is not possible. The end portions 24 of the shell are integral with the rim portion 23 thereof and they extend radially inwardly along the axial end surfaces of the main body part 18 to a point adjacent to the radially inner edge thereof. Preferably, as shown in the drawing, said end portions 24 extend inwardly a distance slightly less than the corresponding extent of the body part 18 to insure against contact between the inner edges 24a thereof and the radially outer surface of the inner ring 12.

The self-lubricating material, such as graphite, nylon or polytetrafluoroethylene, of which the main body part 18 is formed has low-friction characteristics and has some self-lubricating properties. Thus, it is possible for the bearing construction to survive and to operate effectively in sparsely lubricated environments and even for limited periods of no lubrication. The shell 22 provides dimensional stability and adequate strength for the separator so that the bearing is capable of both continuous and intermittent, high- or variable-speed operation even under extreme high or low temperatures or under rapidly changing temperatures and is able to withstand vibratory and shock loadings.

The shell 22 is formed on the main body part 18 by an electrodeposition procedure of the type commonly known as electroforming. This is essentially an electroplating process in which a relatively thick metal layer or coating of uniform wall thickness is deposited on the object being coated.

The shell 22 may consist of any suitable metal capable of being applied to the main body part 18 by an electrodeposition process. Suitable metals for this purpose include nickel, copper, iron and silver. The particular metal used in any given instance will depend upon cost considerations and the use to which the bearing construction will be put. In appropriate cases, the shell 22 may consist of two or more layers of different metals which are electrodeposited in succession on the body part 18 for various purposes such as to obtain desired strength or expansion characteristics or to obtain desired electrodeposition or bonding characteristics.

The wall thickness of the shell 22 should be sufficiently great that the said shell is resistant to appreciable stretching by the body part 18 when same is heated to an elevated temperature. For example, the wall thickness of the shell 22 in a typical embodiment of the invention is .020 inch where the bearing diameter is 1.375 inches, the body 18 is made of graphite and the shell 22 is made of nickel. Electroforming of the shell 22 insures a tenacious bond between the shell and the body part 18. Further, this procedure makes it possible to obtain highly precise dimensional control and to obtain smooth surface finishes, both of which are essential for precision rolling-element bearing constructions, and such can be obtained without subsequent finishing operations which would increase the cost.

The electrodeposition procedure can be carried out in any suitable way following conventional procedures. Since the procedures for electrodepositing the metal shell form no part of the invention and since suitable procedures are well known, a detailed disclosure thereof is unnecessary. However, in general, such procedures involve first cleaning a body part 18 which is of the desired shape. If desired, the surface of the body part 18 can be roughened prior to cleaning in order to enhance the bond between it and the electrodeposited shell. Where the body part 18 is made of graphite, which is a conductor, no further treatment thereof prior to plating is essential although, if desired, a conductive coating, such as a silver film, can be applied thereon in order to increase the speed of the electrodeposition procedure. Those surfaces of the body part 18 to which the shell 22 is not to be applied are coated with a suitable insulator, such as wax or a grease, to prevent deposition of the metal thereon.

Where the body part 18 is made of a nonconductive polymer, such as nylon, it must be coated with a conductive film on those regions thereof where the shell 22 is to be applied. For example, a silver film can be applied on said regions by first sensitizing such regions with a solution containing stannous chloride and concentrated hydrochloride acid and then treating such regions with an ammoniacal silver solution and a reducing solution. Other known techniques, such as vacuum metallizing, can be used to apply a conductive coating on such nonconductive body part.

Thereafter, the body part undergoes an electroplating procedure and a shell of one or more layers and of the needed thickness is plated thereon in accordance with the conventional practice.

In FIGURE 2 there is shown a modification of the invention in which the rolling elements of the bearing construction are cylindrical rollers 31, rather than bearing balls as shown in previously described embodiment. It will be observed that, due to the different shape of the rolling elements, the radial openings in the body part 28 and the shell 32 are substantially rectangular in cross section (FIGURE 4). The edges of the openings in the shell 32 are spaced from the edges of the openings in the body part 28 so that the rollers 31 cannot contact same. The inner and outer rings of the bearing can be of any type suitable for use with rollers and the separator and the electrodeposited shell thereon are similar in all other respects to the previously described embodiment and, therefore, it is believed that further detailed description thereof is unnecessary.

While the foregoing description has all been in terms of a bearing for supporting a rotating member, it will be evident that at least some of the objects of the invention are obtainable by the application of the principles of the invention also to a bearing for supporting a device for rectilinear or curvilinear reciprocation on balls or rollers with respect to a straight or curved track means, such as the ways of the machine tool bed or the guides of a polisher. The separator will be the same as above described excepting that it will be formed in a straight or curved shape paralleling the path of reciprocation instead of in an annulus as above described.

While particular preferred embodiments of the invention have been described above, the invention contemplates such changes or modifications therein as lie within the scope of the appended claims.

What is claimed is:

1. A separator for rolling-element bearings, comprising:
   a curved body extending parallel to the path of travel of said rolling elements and having a series of circumferentially spaced, radially extending openings therethrough into which rolling elements can be placed, said body being composed of a self-lubricating material, and
   an adherent, electrodeposited metal shell of uniform wall thickness and smooth exterior finish on at least the external periphery of said body, said shell holding said body in compression.

2. A separator for rolling-element bearings, comprising:

an annular body of substantial wall thickness, said body having a series of circumferentially spaced, radially extending openings therethrough into which rolling elements can be placed, said body being composed of a self-lubricating material; and an adherent, electrodeposited, shrunken-on metal shell on the periphery of said body, said metal shell being of small, uniform wall thickness and smooth exterior surface finish, the walls of said body defining said openings being free from said shell so that the rolling elements are free to contact said body without contacting said shell, said shell holding said body under compression.

3. A separator according to claim 2, in which the axial end surfaces of said body have an adherent, electrodeposited coating thereon which is integral with said shell on the periphery thereof.

4. A rolling-element bearing construction, comprising:
an outer bearing ring;
an inner bearing ring concentric with and spaced radially inwardly from said outer bearing ring;
an annular separator disposed between said inner and outer bearing rings, said separator having a series of equally spaced, radially extending openings therethrough, said separator consisting of an annular main body part composed of a self-lubricating material and an adherent, electrodeposited, shrunken-on metal shell on the periphery and axial end walls of said body, the walls of said openings being uncoated so that said self-lubricating material is exposed, said shell being of uniform wall thickness and smooth surface finish and holding said body under compression; and a rolling element disposed within each of said openings and extending through and beyond both ends thereof and contacting the opposing surfaces of said inner and outer bearing rings, said rolling elements being free to contact said self-lubricating material exposed to said openings.

5. A rolling-element bearing construction according to claim 4, in which said electrodeposited metal shell is of sufficient thickness to resist appreciable stretching thereof.

References Cited in the file of this patent
UNITED STATES PATENTS

| | | |
|---|---|---|
| 1,996,841 | Stevens | Apr. 9, 1935 |
| 2,029,445 | Schubert | Feb. 4, 1936 |
| 2,038,095 | Bott | Apr. 21, 1936 |
| 2,547,120 | Herwig | Apr. 3, 1951 |
| 2,569,531 | Kunzog | Oct. 2, 1951 |
| 2,834,724 | Mendes | May 13, 1958 |
| 2,861,849 | Case | Nov. 25, 1958 |
| 2,986,480 | Reiss | May 30, 1961 |
| 2,987,350 | Hay | June 6, 1961 |
| 3,047,934 | Magner | Aug. 7, 1962 |
| 3,097,668 | Langer | July 16, 1963 |

FOREIGN PATENTS

| | | |
|---|---|---|
| 1,007,570 | Germany | May 2, 1957 |
| 833,847 | Great Britain | May 4, 1960 |